(No Model.) 2 Sheets—Sheet 1.
T. ROBINS, Jr.
METHOD OF AND APPARATUS FOR JOINING ENDS OF RUBBER BELTS.
No. 539,145. Patented May 14, 1895.
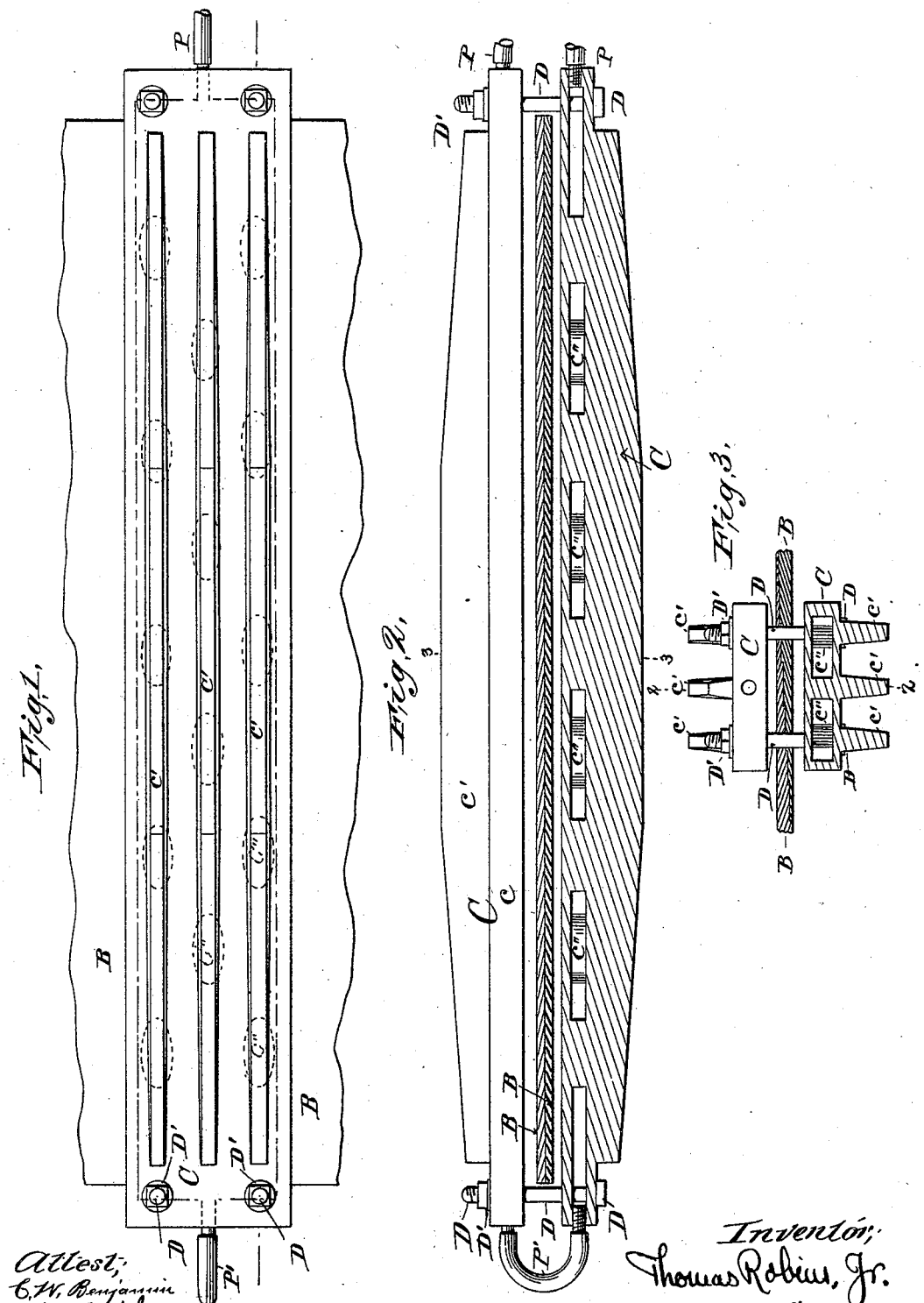

(No Model.)  2 Sheets—Sheet 2.
T. ROBINS, Jr.
METHOD OF AND APPARATUS FOR JOINING ENDS OF RUBBER BELTS.
No. 539,145. Patented May 14, 1895.
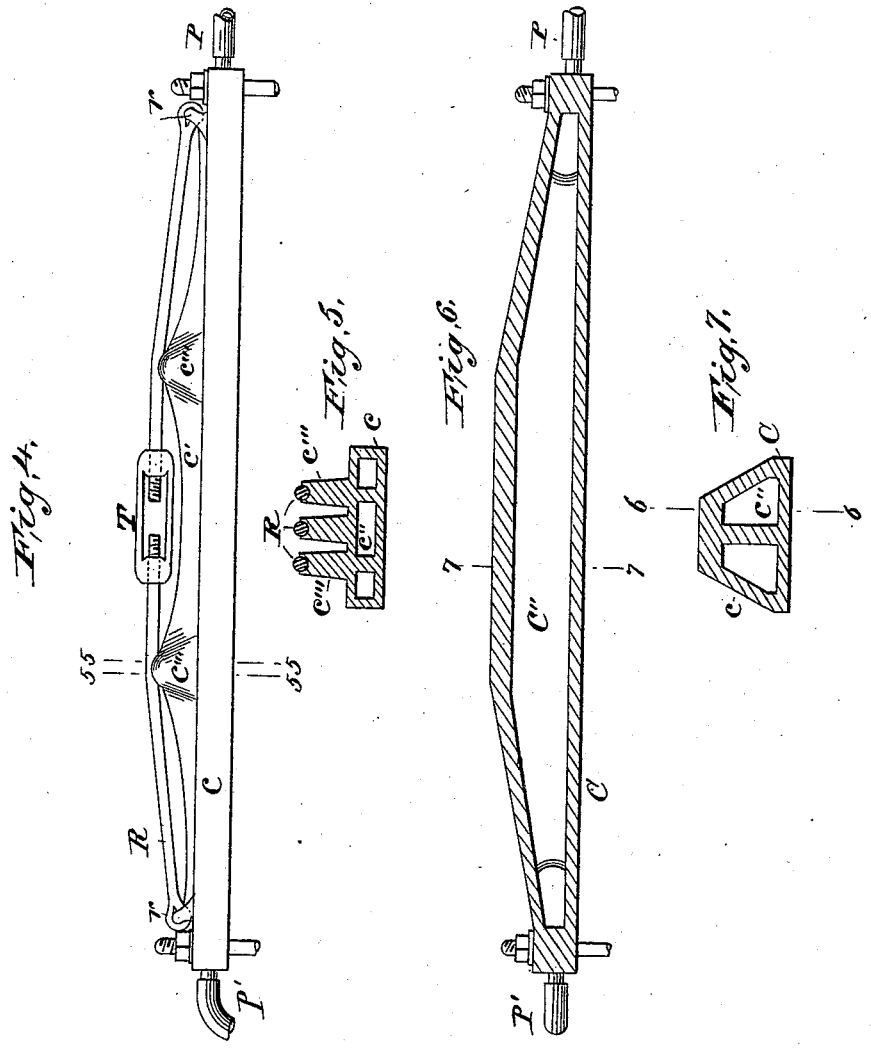

UNITED STATES PATENT OFFICE.

THOMAS ROBINS, JR., OF NEW YORK, N. Y.

METHOD OF AND APPARATUS FOR JOINING ENDS OF RUBBER BELTS.

SPECIFICATION forming part of Letters Patent No. 539,145, dated May 14, 1895.

Application filed May 15, 1893. Serial No. 474,272. (No model.)

*To all whom it may concern:*

Be it known that I, THOMAS ROBINS, Jr., of the city, county, and State of New York, have invented a new and useful Improvement in Methods of and Apparatus for Joining the Ends of Rubber Belts when in Place upon Pulleys, of which the following is a description, reference being had to the accompanying drawings, which form part of this specification.

The purpose of my invention is to enable me to mount a belt upon its pulleys, without unmounting the pulleys or disturbing the shafting, and when in place stretch the belt and thereby draw the ends together, and then vulcanize the splice or joint by means of portable steam-heated presses or clamps. In the case of large belts used in mills and other places without railway communication and therefore accessible so far as freight is concerned only by horses and mules, my invention enables me to send the belt in pieces, with the clamps, and to vulcanize it together at the place where it is to be used.
My invention also enables me to cut and shorten belts that have become stretched in use upon their pulleys, and it also insures, in the case of large belts, a much better and surer fit as regards the length of the belt, than is possible where the belts are made with the ends joined together at the factory.

To these and certain other incidental ends and purposes my invention consists of the method and of the apparatus and its several parts constructed, arranged, combined, and used, substantially in the manner hereinafter described, illustrated, and claimed.

In the drawings, Figure 1 is a plan view of one form of my press or clamp and its connections and attachments. Fig. 2 is an elevation looking along the belt and showing one of the pair of clamps in cross-section on the plane 2 2 of Fig. 3. Fig. 3 is an end view and section of a pair of clamps, the section being taken on plane 3 3 of Fig. 2. Fig. 4 is an elevation; and Fig. 5, a section of a modification, the section being taken between the planes 5 5 of Fig. 4. Fig. 6 is a longitudinal section on plane 6 6 of Fig. 7, showing a modification; and Fig. 7 is a section of Fig. 6 on the plane 7 7.

Throughout the drawings like letters of reference indicate like parts.

The belt to be joined is first tapered or scarfed at the meeting ends. Where a belt of two or more plies is to be spliced the ply at one face of the belt is stripped back and cut off at some distance from the end of the joint and then the next ply stripped back and cut off at a less distance, and so on until the successive plies have been each stripped back and cut off forming a step-shaped or scarf joint. The other end of the belt is prepared in a corresponding manner and the scarfed or tapered faces then coated with vulcanizable rubber cement; and the naphtha or other solvent allowed to dry. Where thin single ply belts are used the scarfing is omitted, the vulcanizing pressure reducing the overlapping ends to practically the same thickness as the rest of the belt. When the belt is ready it is put in place upon the pulleys without in any way making it necessary to remove any of the pulleys or to disturb the shafting. The belt is then stretched over the pulleys by any well known means and the ends thereby brought together and overlapped in proper position. The clamps are then placed on opposite sides of the joint and screwed together until a pressure of some three thousand pounds to the square inch is obtained upon the joint. The clamps are then heated by steam to a temperature of about 260° Fahrenheit and the cemented joint thereby vulcanized.

On account of the enormous pressure required between the clamps, I do not vulcanize large joints at a single operation, but apply the clamps successively, vulcanizing about ten inches of the length of the joint at each operation.

Such briefly is my method. That it may be better understood I will describe the presses or clamps and attachments by which it is carried out, referring to the method more in detail in connection therewith.

In Figs. 1, 2, and 3, I show a form of clamp which I have found of advantage for medium sized belts, though if made sufficiently stiff it may be used for very large belts, and indeed has been used by me for rubber belts an inch thick and seventy inches wide. B indicates the belt, showing the scarf joint. C is the clamp. The bolts, D, pass through bolt holes in the ends of the clamps; and together with the nuts, D', form the means by which the pair of clamps are tightened together and pressure applied to the belt. Each clamp as shown consists of the hollow or box portion, c, provided with the internal posts or columns, c'', for increasing its strength, and stiffening ribs, c', for preventing bending of the clamp. The greatest stiffness is required because clearly the least bending of the clamps will give less pressure at the central portion of the belt than at the edges and form a bad joint. At one end of the pair of clamps I secure admission and exhaust steam pipes, P, and between the other ends of the clamps I provide a short connecting pipe, P'. When the clamps have been screwed in place, steam, under the necessary pressure for a temperature of 260° Fahrenheit, is admitted through one of the pipes, P, and passes through the hollow portion of one clamp and thence through the connecting pipe, P', and the hollow portion of the second clamp to the exhaust pipe, P. These portable clamps may be made in several other ways to attain stiffness without undue weight. The form shown and just described is of cast iron. Where, however, excessive strength and size are required I employ the compound structure of cast iron for compression and wrought iron for tension. Illustrated in Figs. 4 and 5. In this modification the ribs, c', are made very much lighter than in the form before described, but are enlarged at two points of each rib into posts or struts, c''', for supporting the compression due to the wrought iron tension members or rods, R. These tie rods, R, are secured at each end to the clamps and extend up over the struts or posts, c''', and are provided with turn-buckles, T, for tightening them. The turn-buckles are screwed up until there is no deflection observed in the plane face of the clamp when pressure is applied to it.

Figs. 6 and 7 show a further modification which gives great stiffness for a minimum weight of cast iron. In this, the stiffening ribs, c', and the box portion, c, of the clamp, are combined into a single box with a central stiffening partition or column, c'', and with a very heavy arched back to give the required tension strength.

With all these modifications I use substantially the same tightening screws and steam connections, though of course these may be somewhat varied without in any way altering my invention.

The advantage of my portable presses or clamps is especially great in cases where belts of great thickness are required; because even with the greatest care it is exceedingly difficult to construct an endless belt which will accurately fit and be of the right length when in place upon its pulleys. Another great advantage is that by my invention the belt may be put on without removing the pulleys, a thing of course impossible where the belt is completed and joined together at the factory. For mills and other plants to which it is necessary to carry belts on horse or mule back, the belts, if very heavy, may be carried in separate pieces and then joined together and mounted at the place where they are to be used.

The joint made by my method and apparatus is a thoroughly vulcanized water-proof joint. Where belts have been spliced by unvulcanized cement they are subject to deterioration and consequent weakness or rupture and cannot be used with any satisfaction in wet or damp places. My joint, however, is thoroughly vulcanized and forms a practical homogeneous continuation of the belt, making it in the true sense of the word, an endless vulcanized belt, without the use of rivets, lacing, or other mechanical fastenings.

I have now fully explained my method of joining endless vulcanized belts while in place upon the pulleys, and described my apparatus for enabling me to put my method into operation. I have purposely omitted the enumeration of many slight modifications and additions that may be made by mere skill in the art without departing from the principles of my invention, because to set these forth at length would obscure rather than make clear the more essential features.

I claim, however, and desire to secure by these Letters Patent, together with all such changes and additions as may be made by mere mechanical skill and with only the limitations and restrictions expressed or implied, the following:

1. The herein described method of mounting and joining the ends of rubber belts in place upon their pulleys, by scarfing the ends of the belts, applying vulcanizable cement thereto, stretching the belts in place upon the pulleys, suitably drawing together and overlapping the ends and then applying vulcanizing heat and pressure to the joints by means of portable clamps, substantially as and for the purposes set forth.

2. The herein described method of joining the ends of a rubber belt when in place upon the pulleys, by drawing together and overlapping the suitably prepared ends of the belt and applying vulcanizing heat and pressure thereto, whereby the joint may be vulcanized and the belt rendered endless, substantially as and for the purposes set forth.

3. A portable press consisting of hollow or chambered clamps C, steam connections therefor and bolts or clamping rods for drawing the said clamps together and applying pressure, the said bolts or rods being so far removable that the belt after being made endless as described may be withdrawn from the said press, substantially as set forth.

In testimony whereof I hereunto set my hand this 13th day of May, 1893.

THOMAS ROBINS, JR.

Witnesses:
 H. W. BARKLEY,
 HAROLD BINNEY.